A. P. Hughes,
Dovetailing Machine.
Nº 13,574  Patented Sep 18, 1855.

Witnesses:
A. Mac Nutt
H. M. Morris.

Inventor:
A. P. Hughes

UNITED STATES PATENT OFFICE.

AMOS P. HUGHES, OF PHILADELPHIA, PENNSYLVANIA.

DOVETAIL-KEY CUTTER.

Specification of Letters Patent No. 13,574, dated September 18, 1855.

*To all whom it may concern:*

Be it known that I, AMOS P. HUGHES, of Philadelphia, in the county of Philadelphia and State of Pennsylvania, have invented a new and useful Machine for Cutting Dovetail Keys, used for keying or holding together the joints cut by the dovetail-tool, for which I obtained a patent February 21, 1854; and I do hereby declare that the following is a full, clear, and exact description of the construction and operation of the same, reference being had to the annexed drawings, making a part of this specification, in which—

Figure 1 is a perspective view. Fig. 2 represents the end of the stick while passing through the cutters also the edges of the cutters and the chips. Fig. 3 represents two pieces of wood with the cavity between them into which the key is to be driven for the purpose of uniting them.

To enable others to make and use my invention I will describe its construction and operation in detail.

This machine consists of a bed plate upon which is fastened a tube, the transverse section of which is a parallelogram in form, at one end of this tube; on the bed plate, are secured two V shaped cutters or chisels; to be described hereafter, presenting their cutting ends to the end of the tube, in such manner as to receive and operate on the wood which is to be thrust through the tube, the proportion and size of the tube is to be determined by the size of the dovetail keys, which are to be cut.

The wood is prepared by any convenient means of a size to fit nicely into the tube but so as to be easily forced through it; the grain of the prepared wood is transverse to the lengthway of the tube and vertical to the plane of the bedplate. These pieces of wood are successively fed into the tube at the end farthest from the cutters and forced through by lever or other convenient power; the succeeding stick continually pushes out the preceding one. The foremost end of each stick as it leaves the tube encounters the cutters which take off from each side of the stick and the whole length thereof a triangular chip, cutting across the grain, thus making the stick of the desired dovetail form.

The cutters are adjustable so as to operate properly on the wood as it leaves the tube to produce a double dovetail exactly suitable to the cavities into which they are to be driven.

Fig. 1 represents the machine in perspective. A is the bedplate to be properly secured in reference to the feeding and driving arrangement. B is the tube showing distinctly the opening into which the prepared sticks are to be fed, and its use is to guide the wood against the cutters. C, C, are the cutters somewhat resembling in shape the bit used for cutting the thread on wooden screws. These cutters are placed back to back in the line of the tube with their cutting ends next the tube. D, D, are clamps confining the cutters to the bed plate and so arranged as to permit the cutters to be adjusted and thereby insure the exact fit of the key or dovetail into the cavity in which it has to be driven.

Figure 1:
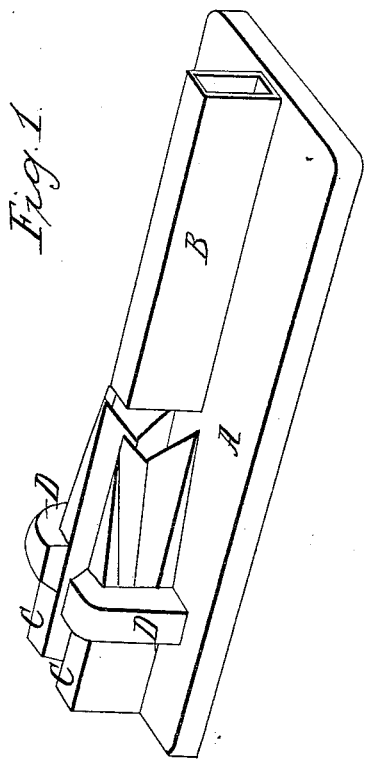
Figure 3:
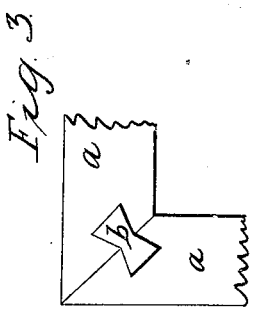
Fig. 3 is a transverse section of a dovetail joint to which this key is applied. *a, a,* are two pieces of wood to be united. *b,* is the cavity into which the dovetail key is to be driven for the purpose of fastening them together.
Figure 2:
Fig. 2 represents the edges of the two cutters and the wood, as if seen by looking through the tube. *a, a,* are the cutting edges of the two cutters. *b,* is the double dovetail as cut and passing between the bits. *c, c,* are the two triangular chips on the outside, as cut off.

The advantages of this invention is not only the rapidity with which the work can be executed, but the certainty which it affords of producing any number of keys of the exact size and shape required.

What I claim as my invention and desire to secure by Letters Patent is—

The combination of two angular or V shaped and adjustable cutters with the guiding tube or its equivalent substantially in the manner and for the purpose specified.

A. P. HUGHES.

Witnesses:
JNO. B. KENNY,
J. E. GOULD.